United States Patent [19]

Sarracino et al.

[11] 4,136,814

[45] Jan. 30, 1979

[54] METHOD FOR IMPROVING THE RESISTANCE TO EMBRITTLEMENT DUE TO HYDROGEN IN WELDED JOINTS

[75] Inventors: Mario Sarracino, Rome; Arduino Lannaioli, Vasanello (Viterbo), both of Italy

[73] Assignee: Italsider S.p.A., Italy

[21] Appl. No.: 818,339

[22] Filed: Jul. 22, 1977

[51] Int. Cl.$^2$ .............................................. B23K 35/30
[52] U.S. Cl. ................................ 228/263; 219/146.23
[58] Field of Search ................... 228/263; 219/146.23, 219/146.1

[56] References Cited

U.S. PATENT DOCUMENTS

| | | | |
|---|---|---|---|
| 1,478,738 | 12/1923 | Holslag | 219/146.23 |
| 3,215,814 | 11/1965 | Dorschv | 219/146.23 |
| 3,404,249 | 10/1968 | Dorschv | 219/146.23 X |

Primary Examiner—Al Lawrence Smith
Assistant Examiner—K. J. Ramsey

Attorney, Agent, or Firm—Robert E. Burns; Emmanuel J. Lobato; Bruce L. Adams

[57] ABSTRACT

Hydrogen embrittlement of welded joints in carbon steels and low-alloy structural steels is minimized by employing a steel welding wire having a nickel content related to the nickel content of the steel according to the expression:

$$\%Ni_{base\ metal} + 0.40\% < \%Ni_{wire} < \%Ni_{base\ metal} + 1.0\%.$$

Either molybdenum or chromium are added to the wire at such a percentage related to the nickel content that hydrogen ions are discharged at the welded seam while the alloying action with the chromium or molybdenum protects the joint from hydrogen embrittlement. The content of chromium, if present, is from 1.5 to 5 times the nickel content of the wire, while the content of molybdenum, if present, is from 0.15 to 0.50 times the nickel content.

4 Claims, No Drawings

METHOD FOR IMPROVING THE RESISTANCE TO EMBRITTLEMENT DUE TO HYDROGEN IN WELDED JOINTS

BACKGROUND OF THE INVENTION

The more and more serious requirements of technique led to the manufacture of structural steels with mechanical features which can be defined as medium-high strength features. Among said steels may be mentioned e.g. the types ASA 60, ASTM A517F, ASTM A5L7B, AISI 4130, ASTM A285, ASTM A537B and so on, whose tensile strength varies, according to the kind of steel, from about 35 kgs/mm2 to about 90 kgs/mm2. These steels on one side allow to achieve several advantages like lower weights, lower thicknesses and/or larger sizes in the structures made therefrom, but on the other side have disadvantages, among which the one referring closer the problem faced by the invention is that said steels are sensitive to the surrounding conditions, particularly as for the tendency to be subject to alterations favouring breaks by brittleness. To this case, one of the most dangerous agent is the class of sulphides present in most forms of pollution and further in most important products, like for instance petroleum; in fact, said sulphides favour strongly the development of hydrogen, and thus are to be considered as one of the main reasons for strains for short breaks in most of the materials with high mechanical characteristics.

That problem favoured researches throughout the world in consequence of which many compositions of carbon steel were obtained, without alloy elements other than carbon or with only a small percentage of such alloy elements, which are in position to oppose efficiently the phenomenon of sulphidic tensiocorrosion.

Among the numerous technical publications, may be mentioned U.S. Pat. No. 3,600,161 by Nippon Steel, the report by H. Kihara at the seventh *World Petroleum Congress*, Proceeding, vol. 5(Mexico) 1967 pages 235–260 and the publication by R. W. Saehle et al 'Stress Corrosion cracking and hydrogen embrittlement of iron-base alloys' St. Etienne Preprint n.Fl, June 12–14, 1973.

However, said metallurgical solutions do not still offer sufficient strength guarantees when welded structural elements are in contact with the sulphidic environment, owing to their high tendency to hydrogen cracking in the heat affected area, or when are provided cathodic protections which naturally increase the amount of hydrogen available for the embrittlement phenomena. These features in the use of high strength steels are e.g. pointed out in the publication 'Studies on sulphide corrosion cracking of high strength steels' of 1963 by the Welding Association of Japan, and in an article by H. Kushiwaji and K. Shimoki in Japan Soc. for Safety Engineering, 5,314 (1966).

An article by J. F. Bates in 'Materials Protection', January 1969, pages 33–40 that phenomenon is studied with tests. In a sulphidic environment, most of the test elements without any protection have a very high percentage of cracking by hydrogen embrittlement in extremely short periods of time, which in the best cases do not reach one year.

Therefore, the situation of the use of structural steels with high mechanical characteristics in places polluted by sulphides, or anyhow where is available hydrogen in the elementary phase, is quite difficult, particularly as for the welded structures of transport and stocking tanks, pipes for crude oil, and so on.

Notwithstanding the great interest of the industry in the improvement of the resistance to the hydrogen embrittlement of welded joints, only a few suggestions suitable to oppose said phenomenon have been advanced.

As far as we know, there are two main methods for the protection against hydrogen embrittlement (besides obviously the embodiment of new compositions of steel) one consisting of subjecting the welded joints to thermal extension treatments, and the other of protecting the welded joints with a coating of e.g. varnishes or resin layers.

As it may be easily understood, both said methods, though efficient in absolute, have remarkable limits. As a matter of fact, the former cannot be used with very large structures, and the latter is obviously efficient for a limited period of time, after which a new coating must be applied.

OBJECT OF THE INVENTION

The invention relates to the welding of structural steels, and particularly to a method for improving the resistance to embrittlement by hydrogen in welded joints of structural steels, with medium and high strength, particularly non-alloy or low alloy carbon steels.

The invention further intends to give a simple and practical answer to the technical requirements concerned, solving the problem of the absorption of hydrogen by said welded joints and their consequent embrittlement, by a welding method assuring a discharge of hydrogen ions far from the heat affected zone, which, having a larger grain structure, is by itself more susceptible to embrittlement by $H_2$.

SUMMARY OF THE INVENTION

The principle of the invention is to create a galvanic cell in the welded zone, such that the hydrogen ions discharge preferably on the welding seam. Said seam is protected against hydrogen absorption through the addition of suitable alloy elements.

The method according to the invention, intended for weldable carbon steels and low-alloy high strength structural steels, is characterized in that in the welding seam is provided, with respect to the basic steel which is to be welded, an enrichment in nickel and in a metal selected from the group comprising chromium and molybdenum. The higher content of nickel in the welding seam, with respect to the adjacent heat affected zone, originates between said seam and heat-affected zone a cell such that the hydrogen ions discharge correspondingly to said seam; the chromium and/or molybdenum oppose the absorption of hydrogen by said seam favouring the hydrogen molecular re-combination and thus the removal in form of bubbles.

DESCRIPTION OF THE PREFERRED EMBODIMENTS

What above is obtained by using a welding wire whose nickel content is defined by the formula:

$$(\%Ni_{base\ metal}+0.40\%) < (\%Ni_{wire}) < (\%Ni_{base\ metal}+1.0\%)$$

the contents of chromium and molybdenum of the welding wire is related to the nickel content: the chromium is to be from 1.5 to 3 times the nickel content, while molybdenum from 15 to 50% of the value of nickel content. Further, it is preferable that the welding may take place at low thermal values, between about 0.5 and 1 kWh/m; when the thickness of the elements to be welded is above 15 mm, it is preferable to keep the previous thermal values and effect a multipass welding.

The tests were made so as to emphasize the conditions of sulphidic stress corrosion. To this end, common steel sheets with a 25 mm thickness were welded with a high thermal value, e.g. 1,5kWh/m, with common wires known in the trade as ARCOS T30Mo and flow type 2 M and with test wires according to the invention. From said welded sheets were obtained not carved test pieces perpendicularly to the welding seam. Said pieces were then stressed axially with a static load up to 60%, 70%, 80% of the value of the steel tensile strength.

Similar pieces were obtained from not welded sheets and subjected to similar loads (60%, 70%, 80%). Then, said test pieces were immersed in a buffer solution consisting of CH3COOH 0.5 M and Na2S 0.01M; the solution pH was about 4. An automatic recorder was recording the test times until the breaking.

The test results, taken in absolute, were difficult to be interpreted, and thus it was necessary to relate all the data to the behaviour of steel in the not-welded phase. For this reason it was defined a first index of stability of the test piece which, for considering the exponential behaviour of the cracking times as a function of the load applied, was calculated for the various test pieces with the expression:

$$S = T_{60\%} + 2T_{70\%} + 4T_{80\%}$$

where T60%, T70%, T80% define the cracking times at the various percentages of load applied as above said.

From said stability index were obtained some embrittlement index, defined as sensitiveness percentage referred to the sensitivity of the metal not welded. The embrittlement index Ni are thus calculated by the expression:

$$Ni = \frac{SB - Si}{SB} \times 100$$

wherein Si is the stability index of the welded piece and SB the one of the corresponding not welded base steel.

For exemplification purposes are herebelow reported the data obtained for two quite used classes of steels, known as ASA 60 and ASA 64, whose weight percent compositions are respectively: ASA 60: C0.19, Mn 1.46, Si 0.38, p0.022, S 0.008, Cr 0.29, V 0.06; ASA 64: C D.17, Mn 1.25, Si 0.31, P 0.012, S 0.017, Cr 0.30, Ni 0.28, V 0.05, Mo 0.09. The compositions of the wires used, besides the known ARCOS T30Mo, are reported in Table 1.

Table 1

| Wire No. | C | Si | Mn | Ni | Cr | Mo | S | P |
|---|---|---|---|---|---|---|---|---|
| 258 | 0.050 | 0.018 | 0.068 | 3.02 | 1.52 | — | 0.011 | 0.019 |
| 259 | 0.044 | 0.016 | 1.02 | 3.02 | — | — | 0.008 | 0.015 |
| 260 | 0.048 | 0.020 | 0.095 | 2.00 | 1.97 | — | 0.008 | 0.015 |
| 262 | 0.053 | 0.028 | 0.10 | 0.99 | 2.50 | — | 0.010 | 0.016 |
| 263 | 0.051 | 0.051 | 1.96 | 1.00 | — | 0.30 | 0.012 | 0.016 |
| 265 | 0.052 | 0.037 | 1.98 | 0.52 | — | 0.59 | 0.011 | 0.016 |

Table 2 shows the data of index of embrittlement N1%.

In evaluating the data appearing in these two tables, it is to be considered that both the welding conditions and the sulphidic stress corrosion conditions were emphasized so as to have a maximum sensitiveness of the welded joints to the hydrogen embrittlement; with the environment and load applied unchanged, if the welding is performed multipass with a thermal value of 0.6 kWh/m, the values of Ni for the joints welded by the method according to the invention decrease of at least for instance for the ASA 60 steel and the wire 262 from 43% to 3.1%, and for the commercial wire T30Mo from 73% to 30%.

Table 2

| | 25mm thick plates welded with counterposed seams and thermal value up to 1.5 kWh/m | | | |
|---|---|---|---|---|
| | ASA 60 | | ASA 64 | |
| Wire | S | N% | S | N% |
| Comm. T30Mo | 500 | 73 | 440 | 63 |
| 258 | 637 | 65 | 445 | 63 |
| 259 | 462 | 75 | 339 | 71 |
| 260 | 680 | 63 | 409 | 65 |
| 262 | 1044 | 43 | 725 | 38 |
| 263 | 1039 | 43 | 702 | 40 |
| 265 | 886 | 52 | 526 | 55 |

As shown in Tables 1 and 2, for the considered steels the test wires 258 and 260 contain an excess of nickel in comparison to what necessary for the invention, and thus they are still too much sensitive to the hydrogen effect. Wire 259, without chromium, is even more sensitive. Wires 262 and 263, with the right contents of nickel and chromium or molybdenum show the best results. For the ASA 60 steel, wire 265 has the right content of nickel, but molybdenum is in excess and thus the joint is made sensitive. For ASA 64 steel, wire 265 has too little nickel and too much molybdenum and thus the joint is still more sensitive.

An examination of the cracking areas confirms what was previously said in this specification: while for the commercial wire the embrittlement cracking always occurred in the heat affected zone, as well as for wires 258, 259 and 260, for wires 263 and 262 the cracks occurred correspondingly to the seam and the cracked surfaces were showing a cracking by corrosion rather than a cracking by hydrogen embrittlement. For wire 265 with the ASA 60 steel, the cracking occurred by hydrogen embrittlement on the seam, while with the ASA 64 steel there was a brittle crack in a heat affected zone.

As already said, the test conditions were emphasized, anyhow, the results of said emphasized tests already show the remarkable improvement obtainable according to the invention in comparison to the joints welded with conventional methods.

Expressed in terms of cracking times, said improvement may be represented, with reference to the ASA 60 steel with an applied load of 80% Rm, by about 10 hours for the conventionally welded steel, about 120–130 hours for the steel welded according to the invention, and about 180–200 hours for the steel not welded.

Therefore, it is to be appreciated that according to the invention it is possible, by a method extremely simple and not more expensive than the ones already known, to obtain considerable improvements in the resistance to the hydrogen embrittlement of welded joints and thus a higher efficiency of the welded structures, by simply acting during the welding operation and avoiding any further thermal treatment of the joints or any periodical surface coating.

It is to be understood that the invention is not limited to the examples shown. It is intended to cover all modifications and equivalents within the scope of the appended claims.

What we claim is:

1. A method of improving the resistance to hydrogen embrittlement of welded joints in carbon steels and low-alloy structural carbon steels, wherein there is created in the weld zone a galvanic couple such that hydrogen ions are discharged onto the welded seam while the latter is protected from the hydrogen action by alloying with a metal selected from the group consisting of chromium and molybdenum; which comprises using for the welding operation a steel welding wire containing nickel and a metal selected from the group consisting of chromium and molybdenum; the nickel content of said wire being related to the nickel content of the steel to be welded according to the following expression:

$$\%Ni_{base\ metal} + 0.40\% < \%Ni_{wire} < \%Ni_{base\ metal} + 1.0\%$$

and the chromium content of said wire if present being between 1.5 and 5 times the nickel content of the wire, and the molybdenum content of the wire if present being between 0.15 and 0.50 times the nickel content of the wire.

2. A method as claimed in claim 1 wherein the welding operation is carried out with low thermal values in the range of 0.5 and 1 KWh/m.

3. A method as claimed in claim 1 in which the percent composition of the welding wire used is essentially:
C = 0.0053,
Si = 0.028,
Mn = 0.10,
Ni = 0.99,
Cr = 2.50,
S = 0.010,
P = 0.016 and balance Fe.

4. A method as claimed in claim 1 in which the percent composition of the welding wire used is essentially:
C 0.051,
Si 0.051,
Mn 1.96,
Ni 1.00,
Mo 0.30,
S 0.012,
P 0.016 and balance Fe.

* * * * *